Figure 1:
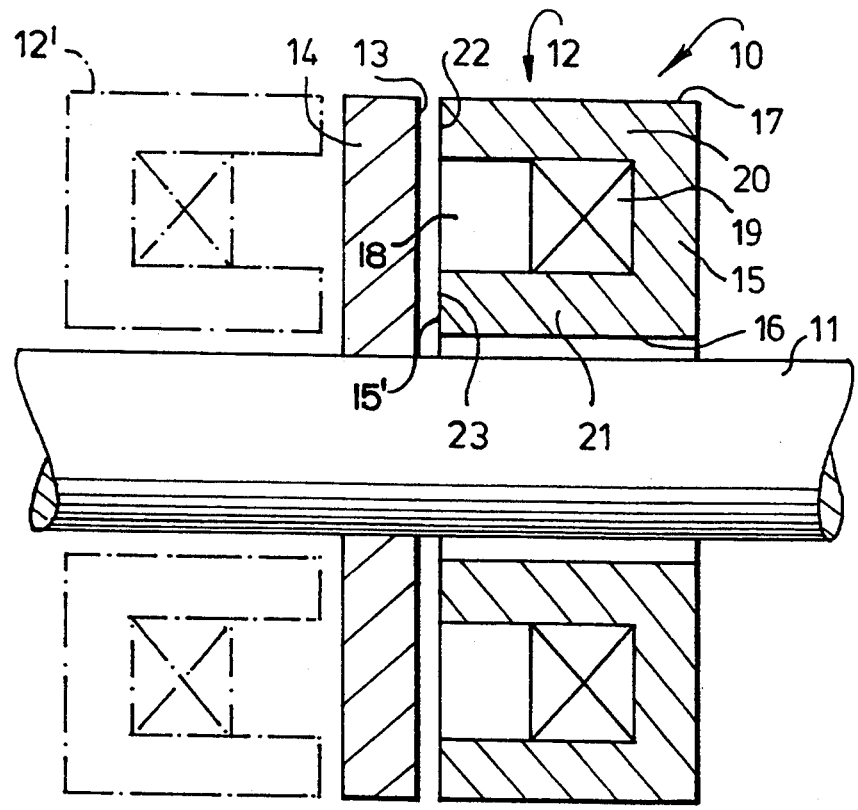

United States Patent [19]

New

[11] Patent Number: 5,406,157
[45] Date of Patent: Apr. 11, 1995

[54] ELECTROMAGNETIC BEARING ARRANGEMENT

[75] Inventor: Nigel H. New, Harrow, United Kingdom

[73] Assignee: The Glacier Metal Company Limited, Middlesex, United Kingdom

[21] Appl. No.: 90,700

[22] Filed: Jul. 13, 1993

[30] Foreign Application Priority Data

Aug. 22, 1992 [GB] United Kingdom ............... 9217905

[51] Int. Cl.$^6$ ............................................... H02K 7/09
[52] U.S. Cl. ................................... 310/90.5; 310/268
[58] Field of Search ................ 310/90.5, 179, 268, 310/254

[56] References Cited

U.S. PATENT DOCUMENTS

| | | | |
|---|---|---|---|
| 3,909,082 | 9/1975 | Ishikawa | 310/90.5 |
| 4,948,348 | 8/1990 | Doll et al. | |
| 5,027,280 | 6/1991 | Ando et al. | 310/90.5 |
| 5,068,558 | 11/1991 | Yamamura | 310/90.5 |
| 5,101,130 | 3/1992 | Jayawant et al. | |
| 5,153,475 | 10/1992 | McSparran | 310/90.5 |
| 5,256,637 | 10/1993 | Rao | 310/90.5 |

FOREIGN PATENT DOCUMENTS

| | | | |
|---|---|---|---|
| 0289980 | 11/1988 | European Pat. Off. | |
| 0311122 | 4/1989 | European Pat. Off. | 310/90.5 |
| 0362881 | 4/1990 | European Pat. Off. | 310/90.5 |
| 0411696A3 | 2/1991 | European Pat. Off. | |
| 2271441 | 12/1975 | France | |
| 1497253 | 4/1970 | Germany | |
| 0021362 | 6/1972 | Japan | 310/90.5 |
| 59-164416 | 1/1985 | Japan | |
| 2219357 | 12/1989 | United Kingdom | |
| 1394334 | 5/1988 | U.S.S.R. | 310/90.5 |

*Primary Examiner*—R. Skudy
*Attorney, Agent, or Firm*—Nixon & Vanderhye

[57] ABSTRACT

An electromagnetic axial shaft bearing 50 (FIG. 2) reduces rotational stresses on a ferromagnetic rotor 14′ by reducing its radius and displacing inwardly the radially outer, axially extending part 51 of the stator core 15 containing an axial groove 18 and electromagnet coil 19 so that the outer stator pole 22 overlies the stator electromagnet coil.

6 Claims, 2 Drawing Sheets

ELECTROMAGNETIC BEARING ARRANGEMENT

This invention relates to electromagnetic bearing arrangements for supporting a rotatable shaft against thrust forces acting on that shaft along its longitudinal axis.

In such an electromagnetic axial, or thrust, bearing a ferromagnetic disc fixed to, and extending radially of, the shaft comprises a rotor. Disposed adjacent at least one face of the rotor is a stator comprising one or more electromagnets which attract the rotor with an axial force that counters and balances an external thrust load on the shaft in response to detection of displacement of the shaft by the external thrust load. If such external loads occur in one direction only then only one electromagnet is necessary whereas if such external thrust loads occur in both directions an electromagnet is provided each side of the rotor.

The magnitude of external axial load to be balanced determines the radial dimensions of the rotor and stator.

In a typical electromagnetic axial bearing, shown in sectional elevation in FIG. 1 at 10 in relation to shaft 11, each stator 12 associated with a radially extending face 13 of the rotor 14 comprises an electromagnet having an annular core 15 extending around the shaft and in the surface 15' thereof facing the rotor intermediate its radially inner and outer ends 16, 17 respectively an annular groove 18 containing an annular electromagnet coil 19. The axially extending portions or limbs 20, 21 of the stator core radially separated from each other by the groove provide stator pole faces 22, 23 respectively for the electromagnet in facing relationship with the rotor face 13.

A further stator shown ghosted at 12' may be disposed adjacent the other face of the rotor 14 to accommodate shaft thrust forces acting in the opposite direction.

The axial force exerted on the rotor by the electromagnet in countering an axial load on the shaft is a function of the magnetic flux flowing through the magnetic circuit defined by the stator core and rotor. Such flux is maximised by having a minimal range of gaps between the stator poles and the rotor, by the areas of pole faces, materials of the core and rotor and by the electromagnet coil.

It is usual for the rotor to comprise a soft ferromagnetic material but problems arise in respect of very high speed shaft rotation with respect to its mechanical strength in accommodating centrifugal stresses put upon it. Such stresses are a function of radial distance from the rotational axis of the shaft so that it has been proposed to reduce the effective radius of the rotor.

In the arrangement 10 as shown, the rotor radius is limited by the radial dimensions required of the stator pole faces 22 and 23 and also by the radial dimensions of the groove 18 in order to accommodate an electromagnet coil having sufficient number of turns and current capacity.

To overcome such limitations on rotor radius imposed by the stator it has been proposed to reduce the axial thickness of the rotor towards its radially outer end in steps or as a taper or both, as described in GB patent specifications 2,219,357 and EP-A-0411696. Whereas such arrangements address the problem of rotor stresses by removing mass from its periphery the rotor itself is not reduced in radius and more complex in manufacture.

It is an object of the present invention to provide an electromagnetic axial shaft bearing arrangement which permits in simple manner minimisation of centrifugal rotor stresses.

According to the present invention an electromagnetic axial shaft bearing arrangement comprises a rotor of ferromagnetic material carried by, and extending radially of, the shaft for rotation therewith, and disposed adjacent at least one radial face of the rotor a stator comprising an electromagnet having an annular core extending around the shaft and in the surface thereof facing the rotor intermediate its radially inner and outer ends at least one annular groove containing an annular electromagnet coil, the axially extending portions of the stator radially separated by each groove providing stator poles for the electromagnet, said radially outer, axially extending portion of the stator being also directed radially inwardly to define an electromagnet pole face aligned with the radially outer part of the rotor face and which in a radial direction at least partially overlies the associated electromagnet coil.

Conveniently the radially outer, axially extending portion of the stator comprises a discrete annular stator pole member secured to the radially outer, axially extending part of the stator to form an axial continuation thereof.

Figure 2:
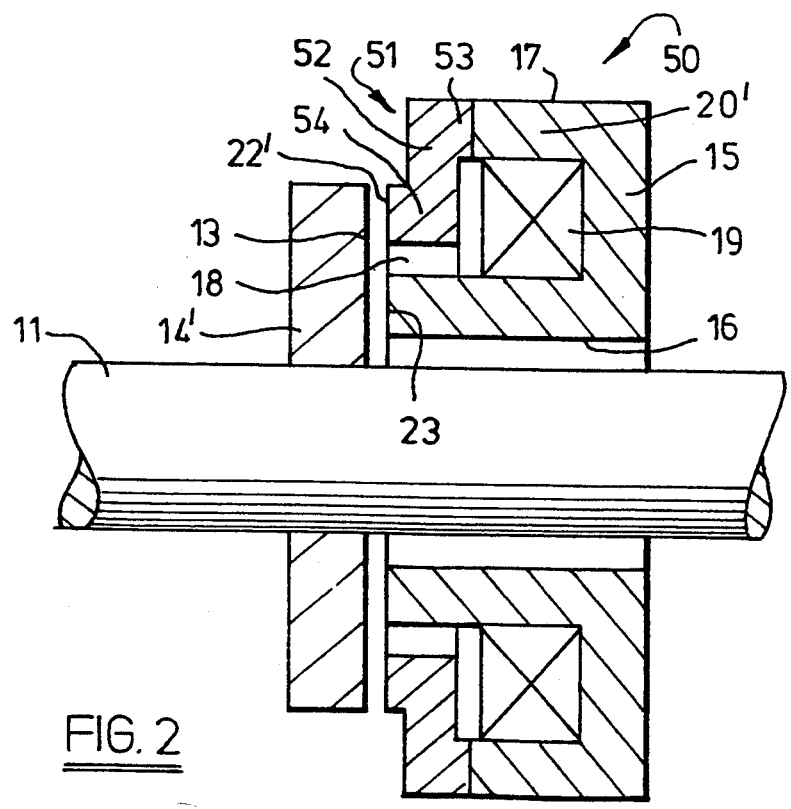
Figure 3:
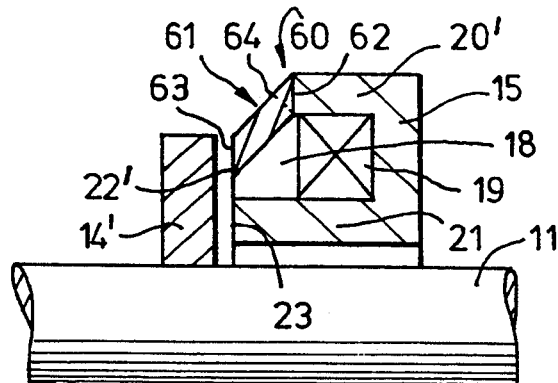
Figure 4:
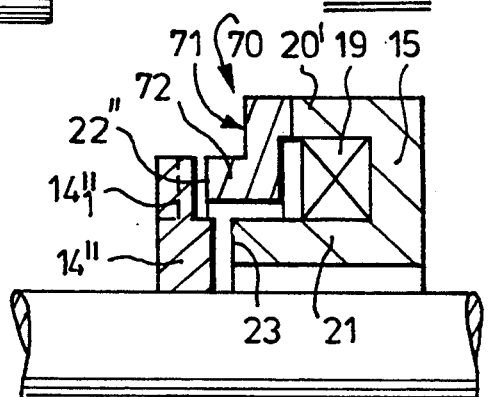
Figure 5:
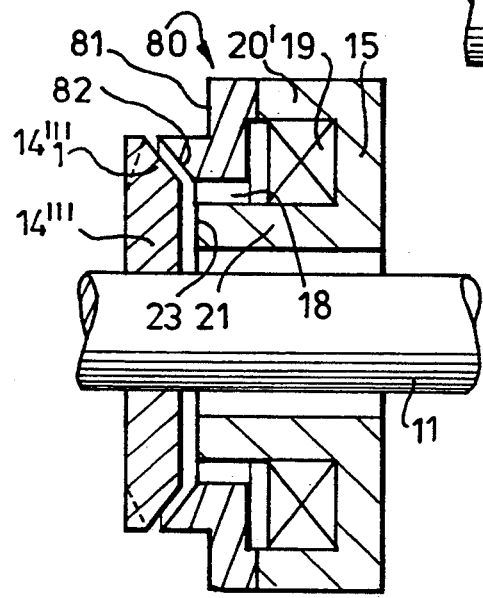
Figure 6:
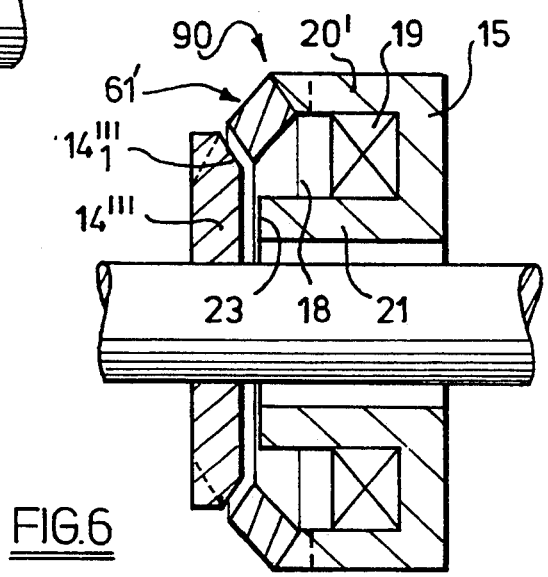

Embodiments of the invention will now be described by way of example with reference to the accompanying drawings, in which:

FIG. 1, referred to hereinbefore, is a sectional elevation through a known form of electromagnetic axial shaft bearing arrangement, FIG. 2 is a sectional elevation through an electromagnetic axial shaft bearing arrangement in accordance with a first embodiment of the present invention, having a rotor of uniform thickness and cranked stator pole member, FIG. 3 is a sectional elevation through an arrangement similar to FIG. 2 comprising a second embodiment of the present invention, having a rotor of uniform thickness and an inclined stator pole member, FIG. 4 is a sectional elevation through an arrangement similar to FIG. 2 comprising a third embodiment of the present invention, having a cranked stator pole member and a rotor having an outer radial part of uniform reduced thickness, FIG. 5 is a sectional elevation through an arrangement similar to FIG. 4 comprising a fourth embodiment of the present invention having a tapered outer radial part of the rotor, and FIG. 6 is a sectional elevation through an arrangement comprising a fifth embodiment of the present invention having a tapered outer radial part of the rotor and an inclined stator pole member.

Referring to FIG. 2, an electromagnetic axial shaft bearing arrangement 50 in accordance with a first embodiment of the present invention is generally similar to the prior art arrangement 10 shown in FIG. 1 and like parts are given like reference numerals.

The arrangement differs in that the ferromagnetic rotor, 14' is radially shorter than the rotor 14 and the radially outer, axially-extending stator portion or limb 20' of core 15 is axially shorter than limb 20.

The limb 20' carries, as an axially-extending continuation, a discrete annular stator pole member 51 secured to the limb and forming part of the magnetic circuit. The member 51 is directed also radially inwardly, that is, is cranked to include a radially inwardly extending portion 52 intermediate axially extending portion 53 that forms the continuation of limb 20' and axially extending portion 54, and terminates in a radially outer stator pole face 22' that is aligned with the radially outer part of the smaller rotor face 13 and, in a radial direction, overlies the electromagnet coil 19.

The arrangement thus permits of a reduction in the radius of the rotor to one that is no longer dependant upon the dimension, in a radial direction, of the electromagnet coil. Thus the coil may even be longer in the radial direction to increase the level of magnetic flux for a given current density in the coil. This may also help to compensate for any loss of efficiency due to the shape or junction with the stator pole member. It may also help to permit a reduction in axial coil dimension to accommodate the stator pole member.

It will be appreciated that use of such a discrete stator pole member permits the electromagnet to be readily wound or otherwise disposed in the stator groove 18 before the member is secured to the core.

However, there is nothing in principle to prevent the stator pole member being put in place prior to winding a coil in groove 18, subject to any practical difficulties in so winding a coil efficiently.

In such event, it will be appreciated that the radially outer, axially extending portion of the stator may be an integral part of the core and not a separate stator pole member.

Furthermore the radially outer, axially extending portion of the stator may take a form other than the cranked member described above which in integral form or as a discrete member may ease any task of subsequently winding an electromagnet coil.

Referring to FIG. 3, this shows in sectional elevation a further embodiment of axial shaft bearing arrangement 60, which is similar to the arrangement 50 of FIG. 2 with like reference numerals for like parts. In this arrangement 60 a stator pole member 61 is secured to the end of shortened axially extending stator portion or limb 20', after disposition of the coil 19, taking the form of a frusto-conical annular member whose axial ends comprise radially extending faces 62, 63, one of which is secured to limb 20' and the other of which comprises radially outer stator pole face 22' which is disposed facing the radially outer part of the rotor and overlies the electromagnet coil 19.

Such form of radially outer, axially extending portion of the stator may alternatively be integral with the stator core and more readily permits subsequent winding of the electromagnet coil than the arrangement 50, although is not as compact in an axial direction.

It will be understood that the interface between the stator core limb 20' and a discrete member 61 may be other than in a radial plane as at 62 as long as flux is coupled efficiently; for example, the end of the limb may be frusto-conical and the end face of the member formed onthogonally to its sides as shown by broken line 64.

The bearing arrangement of the present invention enables a bearing rotor of smaller diameter than hitherto to be used. However this arrangement may be used in combination with the proposals of the above-mentioned patent specifications, that is, in combination with a rotor having a radial outer portion of reduced axial thickness.

Referring to FIG. 4, which is similar to the arrangement of FIG. 3 and uses like reference numerals for corresponding parts, a third embodiment 70 has the radially outer portion of the reduced radial rotor 14" also of reduced thickness at $14_1$". The cranked stator pole member 71 has one axially extending limb 72 extending axially further than the radially inner stator pole 23 and provides radially outer stator pole 22" adjacent the reduced thickness rotor portion $14_1$", the reduction in rotor dimensions at its radial extremity providing maximal reduction in inertia and centrifugal stresses.

Referring to FIG. 5, in an arrangement 80 alternative to the form shown in FIG. 4, the cranked stator pole member 81 has a pole face portion 82 that is inclined to the radial direction and aligned with a conically tapered peripheral edge $14_1$'" of the reduced radius rotor 14'".

FIG. 6 shows a fifth embodiment 90 which combines the tapered rotor structure of FIG. 5 with the inclined radially outer, axially extending portion 61' similar to portion 61 of the core of FIG. 3.

In any of the above, it will be appreciated that the radially outer, axially extending portion of the core may be provided by a discrete stator pole member or be formed integrally with the core.

It will also be appreciated that other configurations may be defined within the scope of the claims.

The axial shaft bearing arrangement described hereinbefore have all comprised stator cores of 'C'-shaped section containing a single annular electromagnet coil. It will be appreciated that the invention may be applied with no change with stator cores of 'E'-shaped section employing two electromagnet cores intermediate three stator poles faces.

Although the axial shaft bearings described in accordance with the present invention have comprised a single stator arrangement to counter axial shaft thrust forces in one direction it will be appreciated that to accommodate forces in both axial directions a second stator arrangement may be disposed adjacent the other radially extending face of the rotor.

I claim:

1. An electromagnetic axial shaft bearing arrangement comprising a rotor of ferromagnetic material carried by, and extending radially of an axially extending shaft for rotation therewith, said rotor having a radially extending face with a radially outer part adjacent a periphery of the rotor and a radially inner part adjacent the shaft; a stator disposed adjacent said radially extending face of the rotor comprising an electromagnet having an annular core extending around the shaft, said annular core having radially inner and outer ends, and in a surface of said annular core facing the rotor intermediate said radially inner and outer ends of said annular core there is provided at least one annular axially extending groove containing an annular electromagnet coil, said annular axially extending groove thereby defining radially inner and outer axially extending portions of said stator, said radially outer, axially extending portion of the stator tapered radially inwardly to define a radially outer stator pole face aligned with the radially outer part of said radially extending face of the rotor and which in a radial direction at least partially overlies said electromagnet coil, and wherein said radially inner, axially extending portion of said stator is provided with a radially inner pole face aligned with the radially inner part of said radially extending face of the rotor.

2. An electromagnetic axial shaft bearing arrangement as claimed in claim 1 in which said radially outer, axially extending portion of said stator includes a discrete annular stator pole member secured thereto, forming an axial continuation thereof, and defining said radially outer stator pole face.

3. An electromagnetic axial shaft bearing arrangement as claimed in claim 2 in which said stator pole member is adapted to be secured to said radially outer, axially extending portion of the stator subsequently to disposition of the electromagnet coil in said annular axially extending groove.

4. An electromagnetic axial shalt bearing arrangement as claimed in claim 1 in which said radially outer stator pole face extends substantially radially between said inner and outer axially extending portions.

5. An electromagnetic axial shaft bearing arrangement comprising a rotor of ferromagnetic material carried by, and extending radially of an axially extending shaft for rotation therewith, said rotor having a radially extending face with a radially outer part adjacent a periphery of the rotor and a radially inner part adjacent the shaft; a stator disposed adjacent said radially extending face of the rotor comprising an electromagnet having an annular core extending around the shaft, said annular core having radially inner and outer ends, and in a surface of said annular core facing the rotor intermediate said radially inner and outer ends of said annular core there is provided at least one annular axially extending groove containing an annular electromagnet coil, said annular axially extending groove thereby defining radially inner and outer axially extending portions of said stator, said radially outer, axially extending portion of the stator being also directed radially inwardly to define a radially outer stator pole face aligned with tile radially outer part of said radially extending face of the rotor and which in a radial direction at least partially overlies said electromagnet coil, and wherein said radially inner, axially extending portion of said stator is provided with a radially inner pole face aligned with the radially inner part of said radially extending face of tile rotor; and in which said rotor is axially thinner at said radially outer part associated with said radially outer stator pole face than at said radially inward part associated with said radially inner stator pole face, such that said radially outer part of said rotor is parallel to and axially offset on one side thereof from said radially inner part of said rotor, and further wherein said radially outer, axially extending portion of said stator is adapted to provide said radially outer stator pole face axially displaced with respect to said radially inner stator pole face.

6. An electromagnetic axial shaft bearing arrangement comprising a rotor of ferromagnetic material Carried by, and extending radially of an axially extending shaft for rotation therewith, said rotor having a radially extending face with a radially outer part adjacent a periphery of the rotor and a radially inner part adjacent the shaft; a stator disposed adjacent said radially extending face of the rotor comprising an electromagnet having an annular core extending around the shaft, said annular core having radially inner and outer ends, and in a surface of said annular core facing the rotor intermediate said radially inner and outer ends of said annular core there is provided at least one annular axially extending groove containing an annular electromagnet coil, said annular axially extending groove thereby defining radially inner and outer axially extending portions of said stator, said radially outer, axially extending portion of the stator being also directed radially inwardly to define a radially outer stator pole face aligned with the radially outer part of said radially extending face of the rotor and which in a radial direction at least partially overlies said electromagnet coil, and wherein said radially inner, axially extending portion of said stator is provided with a radially inner pole face aligned with the radially inner part of said radially extending face of the rotor; and further wherein said radially outer, axially extending portion of said stator is adapted to provide said radially outer stator pole face axially displaced with respect to said radially inner start pole face; and in which the radially outer part of the rotor is tapered to a narrower axial thickness and said radially outer stator pole face defined by said radially outer, axially extending portion is also tapered so as to be substantially parallel to said radially outer part of the rotor.

* * * * *